United States Patent
Deal

[11] 4,242,734
[45] Dec. 30, 1980

[54] IMAGE CORNER DETECTOR USING HAAR COEFFICIENTS

[75] Inventor: Bruce C. Deal, Santa Ana, Calif.

[73] Assignee: Northrop Corporation, Los Angeles, Calif.

[21] Appl. No.: 69,883

[22] Filed: Aug. 27, 1979

[51] Int. Cl.³ .................... H04N 7/12; G06F 15/332
[52] U.S. Cl. ................. 364/515; 358/133; 358/260; 364/725
[58] Field of Search .............. 364/515, 725, 727; 358/133, 260; 340/146.3 T, 146.3 AC, 146.3 AE, 146.3 AQ, 146.3 MA

[56] References Cited

U.S. PATENT DOCUMENTS

| | | | |
|---|---|---|---|
| 3,576,980 | 5/1971 | Doyle | 364/700 |
| 3,846,752 | 11/1974 | Nakano et al. | 340/146.3 Q |
| 3,869,697 | 3/1975 | Kawasaki | 340/146.3 P |
| 3,976,826 | 8/1976 | Fullton, Jr. | 358/133 |
| 3,980,809 | 9/1976 | Cook | 358/260 |
| 3,981,443 | 9/1976 | Lynch et al. | 364/715 |
| 4,005,385 | 1/1977 | Joynson et al. | 340/146.3 AE |
| 4,055,756 | 10/1977 | Jolivet et al. | 364/725 |
| 4,134,134 | 1/1979 | Lux | 358/133 |
| 4,179,709 | 12/1979 | Workman | 358/133 |
| 4,189,748 | 2/1980 | Reis | 358/133 |

Primary Examiner—Jerry Smith
Attorney, Agent, or Firm—Edward A. Sokolski

[57] ABSTRACT

A machine for detecting image corners in two-dimensional images. The machine transforms two-dimensional images by means of the Haar transform into the two-dimensional Haar transform domain. Certain of the Haar transform coefficients, which are sensitive to corners, are compared to a threshold and an output indicative of a corner is generated whenever a corner sensitive transform coefficient exceeds the threshold.

3 Claims, 2 Drawing Figures

IMAGE CORNER DETECTOR USING HAAR COEFFICIENTS

BACKGROUND OF THE INVENTION

1. Field of the Invention

This invention pertains to digital processing machines for processing two-dimensional images. More particularly, this machine pertains to the detection of corners in video images where the images are transformed in two dimensions by means of the Haar transform and are represented in the transform domain by two-dimensional arrays of Haar transform coefficients.

2. Description of the Prior Art

Various systems have been developed to recognize specific images, see e.g. "Pattern Identifying Systems", U.S. Pat. No. 3,869,697; "Character Recognition Apparatus", U.S. Pat. No. 3,846,752; and "Pattern Recognition Apparatus", U.S. Pat. No. 3,597,731. These systems operate on the two-dimensional video picture to recognize a specified image such as a letter in the alphabet.

Other machines have been developed for detecting lines and edges utilizing the Hadamard transform, see e.g. "Pattern Recognition Machine for Analyzing Line Orientation ", U.S. Pat. No. 4,005,385. A system has also been developed for recognizing corners when the outline of the object is defined as a series of points, see "Automatic Corner Recognition System", U.S. Pat. No. 3,576,980. The latter system operates in the image domain and requires as an input the location of a series of points which lie on the boundary of the image.

SUMMARY OF THE INVENTION

The invention described in this application utilizes the two-dimensional Haar transform to detect image corners without first requiring the outline of the image be determined. Because this invention utilizes Haar transform coefficients to detect corners, it is suitable for use in connection with other, more general, image processors which also utilize the Haar transform. Furthermore, because this invention recognizes a component (a corner) of more general images, it can be used in connection with other processors to detect and identify a large number of different images based on the number, location, and relative position of the corners identified by this invention.

This invention Haar transforms, in two dimensions, digital data representing two-dimensional images. The absolute magnitude of each Haar transform coefficient, within the subset of transform coefficients that are sensitive to corners, is compared to a threshold. Whenever a corner sensitive, transform coefficient exceeds the threshold, this invention generates an output indicating the existence of a corner and outputs the associated transform coefficient and its identifying address. The threshold may be fixed at a value preselected by the operator or the threshold may be automatically adjusted in an adaptive manner dependent upon the number of corners detected in previous sets of transform coefficients.

DESCRIPTION OF THE PREFERRED EMBODIMENT

Figure 1:
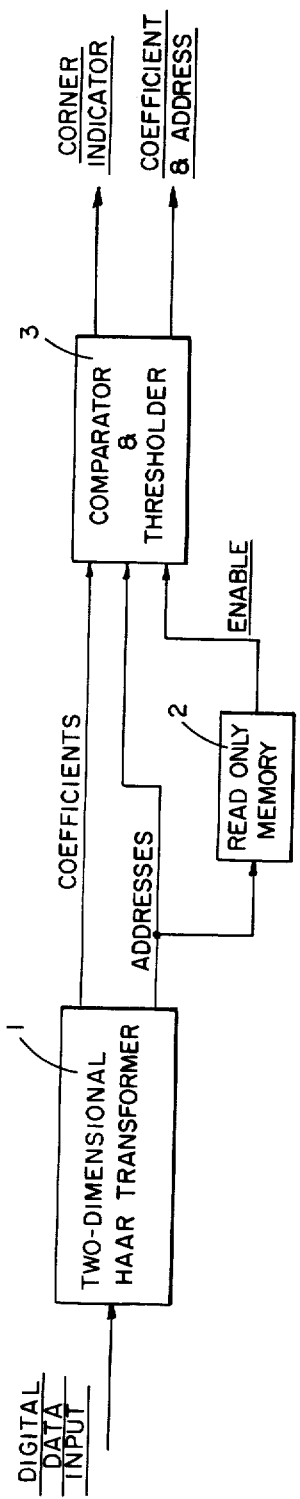
FIG. 1 is a block diagram of the invention.

Referring now to FIG. 1. Digital data representing two-dimensional images is input to two-dimensional Haar transformer 1. The digital data may be in series or parallel form, but in either case the data is input as successive sets of data representing two-dimensional arrays of picture elements. In most applications, so that memories within the invention can be modest in size, the two-dimensional array of picture elements represented by the digital data is a subset of the much larger two-dimensional image which is processed by the invention. Methods for obtaining successive two-dimensional subarrays from a much larger two-dimensional image are straightforward and well-known. For instance, the sequence of picture elements (pels) obtained from the raster scan of a two-dimensional video scene, together with identifying addresses can be processed by a logic circuit to select only those pels that are members of a specified subarray. In such an arrangement, the remaining pels, not belonging to the subarray, are ignored. During successive periods of time, the location of the subarray is shifted so as to cover, in steps, the entire video scene. As an alternative, the entire video scene could be scanned once and all the pels stored in the buffer memory from which the subarrays would then be selected, one subarray at a time, by logic circuitry, for processing by the image corner detector. See U.S. Pat. No. 3,980,809 which describes such a system as part of its "data compressor". If higher processing rates are desired, a plurality of image corner detectors could be operated in parallel to simultaneously process each of the subarrays within the video scene. In the embodiment described in this application, a single image corner detecting device is used to process successive subarrays obtained from the video scene by any convenient method including those described above.

Each successive $n \times n$ array of digital data is transformed by two-dimensional Haar transformer 1 into an $n \times n$ array of transform coefficients. A two-dimensional transformer suitable for use in this application has been described in U.S. Pat. No. 3,981,443 and U.S. Pat. No. 4,189,748. Two-dimensional Haar transformer 1 outputs successive two-dimensional arrays of transform coefficients, together with their addresses, to comparator and thresholder 3. The transfer of this data may be in either serial or parallel form. The addresses are also output by two-dimensional Haar transformer 1 to a read only memory 2 which contains a list of the subset of transform coefficients in the $n \times n$ array which are sensitive to corners. By the way of example, the coefficients in a $16 \times 16$ array which are sensitive to corners are indicated by "x's" in Table 1. The embodiment described here utilizes $16 \times 16$ arrays of picture elements and of transform coefficients. Larger or smaller arrays, however, could be used, although "n" is limited to be a power of 2.

The corner sensitive coefficients are those coefficients with row and column address of "i" and "j" for which $1+2^{k-1} < i,j \leq 2^k$, where k is $+1, +2, +3, \ldots$. The coefficients specified above are sensitive to corners in the sense that a corner detecting coefficient will be significant in size if a significant change in image brightness occurs in both the vertical and horizontal directions within the subset of picture elements within the $n \times n$ array of picture elements for which the particular transform coefficient is sensitive to such changes. The subset of picture elements for which each of these transform coefficients in sensitive may be obtained from an examination of FIG. 4 in U.S. Pat. No. 3,981,443 which contains an example of the one-dimensional Haar transform for a 16×16 array of elements. It must be remembered that the transform illustrated in FIG. 4 is in one dimension, so in order to determine the relationship between the subset of picture elements in the image domain and the corner sensitive transform coefficients, the transform in FIG. 4 must be applied twice, once in the vertical direction and once in the horizontal. Table 2 gives the approximate location of the areas within a 16×16 array of picture elements which are associated with the respective Haar coefficients that are sensitive to image corners.

The read only memory 2 provides an enabling signal to comparator and thresholder 3 to output a corner indication signal for each corner sensitive transform coefficient whose absolute magnitude exceeds a threshold that has been preset in the comparator by the operator. Whenever the corner sensitive coefficient exceeds the threshold, an indication of the corner is output together with the value of the coefficient and its address.

The information output by the comparator and thresholder 3 can be used by a more general image processing machine which may, for instance, utilize the corner information to identify a particular image from its library of the number and relative positions of the corners for different images. The corner indicator also can be used in conjunction with a device which would replace the particular transform coefficient for which a corner is indicated by the maximum value that is utilized by the machine for representing such transform coefficients. Upon retransformation of the array of coefficients into the image domain, the detected corner then would appear as a bright and/or dark area within the reconstructed image.

Figure 2:
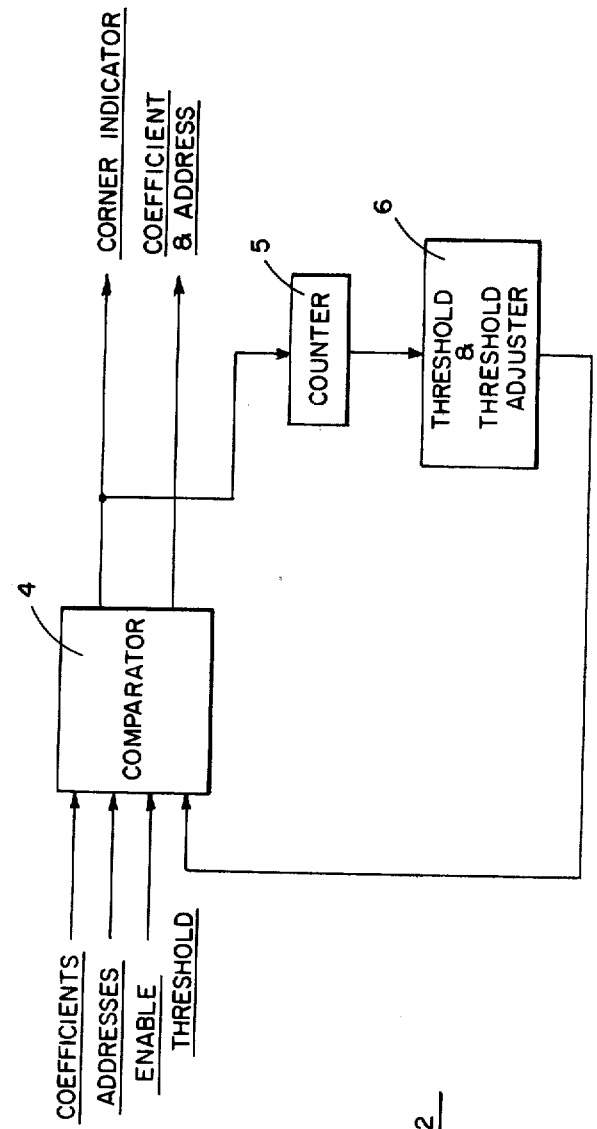
FIG. 2 is a block diagram of the portion of the invention which compares the transform coefficients with a threshold and adjusts the threshold in an adaptive manner.

The threshold contained in comparator and thresholder 3 may be a fixed threshold preselected by the operator. However, in some applications, an adaptive threshold would be more useful. In such circumstances, the preferred embodiment would include provisions for an adaptive threshold. FIG. 2 is a more detailed block diagram of comparator and thresholder 3 which contains a comparator and provides for automatically adjusting the threshold. Referring now to FIG. 2, the transform coefficients, addresses, and an enabling signal from read only memory 2 enter comparator 4, together with a threshold signal. For each edge sensitive transform coefficient whose absolute magnitude exceeds the threshold, the comparator 5 outputs a corner indication, together with the transform coefficient and its address, in the same manner as that described for comparator and thresholder 3. However, the corner indication from comparator 4 also is output to counter 5 which counts the number of such indications that are output for each n×n array of transform coefficients. At the end of the processing of each n×n array of coefficients, the counter outputs the number of corners indicated in the array to threshold and threshold adjuster 6. Threshold and threshold adjuster 6 maintains a value for the threshold and also decreases the threshold by a preselected amount at the end of the processing of the n×n array of transform coefficients if the number output by counter 5 is less than a preselected number and increases the threshold by a preselected amount if the number output by counter 5 exceeds a predetermined number. The threshold that is output by threshold and threshold adjuster 6 is input to comparator 4.

TABLE 1

| | Row Address i | |
|---|---|---|
| | 1 2 3 4 5 6 7 8 9 10 11 12 13 14 15 16 | |
| Column Address J | 1<br>2    X X<br>3    X X<br>4        X X X X<br>5        X X X X<br>6        X X X X<br>7        X X X X<br>8<br>9                        X X X X X X X X<br>10                       X X X X X X X X<br>11                       X X X X X X X X<br>12                       X X X X X X X X<br>13                       X X X X X X X X<br>14                       X X X X X X X X<br>15                       X X X X X X X X<br>16                       X X X X X X X X | X indicates corner detecting Haar coefficient |

TABLE 2

| | | ROW INDEX OF HAAR COEFFICIENT | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| | 1 | | | | | | | | | | | | | | | | |
| | 2 | | | | | | | | | | | | | | | | |
| | 3 | | | 8,8 | 8,16 | | | | | | | | | | | | |
| | 4 | | | 16,8 | 16,16 | | | | | | | | | | | | |
| | 5 | | | | | 4,4 | 4,8 | 4,12 | 4,16 | | | | | | | | |
| COLUMN | 6 | | | | | 4,4 | . | . | 8,16 | | | | | | | | |
| INDEX OF | 7 | | | | | 12,4 | . | . | 12,16 | | | | | | | | |
| HAAR | 8 | | | | | 16,4 | 16,8 | 16,12 | 16,16 | | | | | | | | |
| COEFFICIENT | 9 | | | | | | | | | 2,2 | 2,4 | 2,6 | 2,8 | 2,10 | 2,12 | 2,14 | 2,16 |
| | 10 | | | | | | | | | 6,2 | . | . | . | . | . | . | 4,16 |
| | 11 | | | | | | | | | 8,2 | . | . | . | . | . | . | 6,16 |
| | 12 | | | | | | | | | 8,2 | . | . | . | . | . | . | 8,16 |
| | 13 | | | | | | | | | 10,2 | . | . | . | . | . | . | 10,16 |
| | 14 | | | | | | | | | 12,2 | . | . | . | . | . | . | 12,16 |
| | 15 | | | | | | | | | 14,2 | . | . | . | . | . | . | 14,16 |
| | 16 | | | | | | | | | 16,2 | 16,4 | 16,6 | 16,8 | 16,10 | 16,12 | 16,14 | 16,16 |

X,Y→ROW AND COLUMN ADDRESS OF CORNER
For an N × N matrix, N = $2^P$,
A coefficient at i,j flags a corner at
l $2^{P-r}$, m$2^{P-k}$
where i = $2^r$ + l; 1 ≦ l ≦ $2^r$
j = $2^k$ + m; 1 ≦ m ≦ 2

I claim:

1. A machine for processing successive $n \times n$ arrays of digital data, which data represents two-dimensional images, for the purpose of detecting image corners comprising:
   (a) two-dimensional Haar transformer means for Haar transforming the digital data in two dimensions into successive $n \times n$ arrays of transform coefficients,
   (b) comparator and thresholder means having a preselected threshold set therein,
   (c) a read-only memory containing a list of transform coefficients that are sensitive to corners, the output of said read-only memory being fed to said comparator and thresholder means,
   (d) said comparator and thresholder means comparing the preselected threshold with the absolute magnitude of each of the transform coefficients that are sensitive to corners, and outputting an indication of a corner together with the transform coefficient and its address whenever the absolute magnitude of the transform coefficient exceeds said preselected threshold.

2. The machine described in claim 1 but wherein the preselected threshold is an adaptive threshold.

3. The machine described in claim 1 wherein the comparator and thresholder means comprises:
   (a) a comparator which outputs an indication of corners together with the transform coefficients and their address for which corners are indicated,
   (b) a counter which counts the number of corner indications output by the comparator, and outputs the number of such corner indications,
   (c) threshold and threshold adjuster means for generating a threshold and adjusting the threshold in response to the output of the counter and inputting said threshold to comparator means, and
   (d) said comparator outputting a corner indication together with the coefficient and address of the transform coefficient for which a corner is indicated whenever the absolute magnitude of the transform coefficient exceeds the threshold input to the comparator means and the transform coefficient is one of the transform coefficients sensitive to corners.

* * * * *